US012111028B2

(12) United States Patent
Leung

(10) Patent No.: US 12,111,028 B2
(45) Date of Patent: Oct. 8, 2024

(54) SYSTEMS AND METHODS FOR WATER RESISTANT DECORATIVE LIGHT STRINGS

(71) Applicant: Belgravia Wood Limited, Tortola (VG)

(72) Inventor: Chi Yin Alan Leung, Apleichau (HK)

(73) Assignee: Belgravia Wood Limited, Tortola (VG)

( * ) Notice: Subject to any disclaimer, the term of this patent is extended or adjusted under 35 U.S.C. 154(b) by 0 days.

(21) Appl. No.: 17/763,802

(22) PCT Filed: Oct. 30, 2020

(86) PCT No.: PCT/US2020/058293
§ 371 (c)(1),
(2) Date: Mar. 25, 2022

(87) PCT Pub. No.: WO2021/087313
PCT Pub. Date: May 6, 2021

(65) Prior Publication Data

US 2022/0403989 A1 Dec. 22, 2022

Related U.S. Application Data

(60) Provisional application No. 62/928,354, filed on Oct. 30, 2019.

(51) Int. Cl.
*F21S 4/10* (2016.01)
*F21V 19/00* (2006.01)
(Continued)

(52) U.S. Cl.
CPC .............. *F21S 4/10* (2016.01); *F21V 19/004* (2013.01); *F21V 31/005* (2013.01); *H01R 33/9658* (2013.01); *F21Y 2115/10* (2016.08)

(58) Field of Classification Search
CPC ........ F21V 19/004; F21V 31/005; F21S 4/10; H01R 33/9658
See application file for complete search history.

(56) References Cited

U.S. PATENT DOCUMENTS 5,330,368 A * 7/1994 Tsuruzono ............. H01R 33/09 439/409
5,526,250 A * 6/1996 Ting ..................... H01R 25/142 362/652
(Continued)

FOREIGN PATENT DOCUMENTS

CN 1075197 A 8/1993
CN 202125779 U 1/2012

OTHER PUBLICATIONS

First Office Action dated Jun. 28, 2023 issued in Chinese Patent Application No. 202080072555.0.

*Primary Examiner* — Arman B Fallahkhair
(74) *Attorney, Agent, or Firm* — Troutman Pepper Hamilton Sanders LLP; Ryan A. Schneider; Christopher C. Close, Jr.

(57) ABSTRACT

The present disclosure provides a water-resistant decorative lighting system having a plurality of lamp assemblies and a wiring harness having two or more insulating conductors and configured to electrically connect the plurality of lamp assemblies. Each lamp assembly of the plurality of lamp assemblies includes a lamp holder, a light source, a waterproofing device, and an outer bulb. The lamp holder comprises a hinged portion connected between a first and second side portions. The lamp holder is configured to move about the hinged portion from an open position to a closed position. Each side portion includes a locking mechanism. The light is configured to fit within the lamp holder when the lamp holder is in the closed position. The outer bulb is detachably attachable to the lamp holder.

21 Claims, 8 Drawing Sheets

(51) Int. Cl.

| | |
|---|---|
| ***F21V 31/00*** | (2006.01) |
| ***F21Y 115/10*** | (2016.01) |
| ***H01R 33/965*** | (2006.01) |

(56) References Cited

U.S. PATENT DOCUMENTS

| | | | | |
|---|---|---|---|---|
| 5,667,295 | A * | 9/1997 | Tsui | F21S 4/10<br>362/267 |
| 6,398,386 | B1 * | 6/2002 | Huang | F21S 4/10<br>362/255 |
| 6,921,180 | B2 * | 7/2005 | Huang | H01R 33/09<br>362/253 |
| 10,240,734 | B1 | 3/2019 | Hwang | |
| 11,391,421 | B2 * | 7/2022 | Huang | F21V 17/101 |
| 2010/0073963 | A1 | 3/2010 | Yu | |
| 2011/0310623 | A1 | 12/2011 | Lin | |
| 2012/0302097 | A1 | 11/2012 | Yang | |
| 2017/0336063 | A1 | 11/2017 | Leung et al. | |

* cited by examiner

SYSTEMS AND METHODS FOR WATER RESISTANT DECORATIVE LIGHT STRINGS

CROSS-REFERENCE TO RELATED APPLICATIONS

This application is a national stage application, filed under 35 U.S.C. § 371, of International Patent Application No. PCT/US20/58293, filed on 30 Oct. 2020, which claims benefit under 35 U.S.C. § 119(e), of U.S. Provisional Application Ser. No. 62/928,354, filed on 30 Oct. 2019, which is incorporated herein by reference in its entirety as if fully set forth below.

TECHNICAL FIELD

Aspects of the present disclosure relate to a decorative light string, and, more particularly, a water-resistant decorative light string.

BACKGROUND

Electric lamps, such as light emitting diodes (LEDS), are very commonly used in decorative light strings. Such decorative light strings are typically used to decorate Christmas trees. However, decorative light strings can also be used in other circumstances, such as to decorate the outside of a user's house or yard. Accordingly, it can be desirable to provide a decorative light string suitable for use outdoors.

Conditions of outdoor use of decorative light strings can differ significantly from conditions of indoor use. For example, when used outdoors, decorative light strings can be subject to a variety of weather conditions, such as wind and rain. Due to the construction and manufacturing process, an electric lamp assembly on a decorative light string can not be entirely sealed and can allow water or moisture to leak into the internal compartment of the lamp assembly, which can interfere with the electrical components. For example, in a typical lamp assembly, wires can exit the lamp assembly through holes in the base of the lamp assembly and these holes can provide space for water to enter the internal compartment of the lamp assembly. This area can be particularly susceptible to leaks, as in some cases, the wires exiting the lamp assembly can serve to guide water running down the wires directly into the internal compartment of the lamp assembly. Water that can enter the internal compartment of the lamp assembly can cause damage to the assembly or a malfunction of the assembly, such as a short circuit.

BRIEF SUMMARY

The present disclosure relates to water-resistant decorative lighting system and methods for making the same. An exemplary embodiment of the present disclosure provides a plurality of lamp assemblies and a wiring harness. Each lamp assembly of the plurality of lamp assemblies can include a lamp holder, a light source, a waterproofing device, and an outer bulb. The lamp holder can comprise a first side portion, a second side portion and a hinged portion. The first side portion can have a first locking mechanism. The second side portion can have a second locking mechanism. The hinged portion can be connected between the first and second side portions such that the lamp holder can be configured to move about the hinged portion from an open position to a closed position. The light source can be configured to fit within the lamp holder when the lamp holder is in the closed position. The outer bulb can detachably attachable to the lamp holder. The wiring harness can have two or more insulated conductors. The wiring harness can be configured to electrically connect the plurality of lamp assemblies.

In any of the embodiments disclosed herein, the first locking mechanism can comprise one or more latches. The second locking mechanism can comprise one or more receiving slots. The one or more latches can be configured to couple with the one or more receiving slots.

In any of the embodiments disclosed herein, at least a portion of the waterproofing device can be configured to seal around at least a portion of the light source.

In any of the embodiments disclosed herein, at least a portion of the waterproofing device can be configured to seal around at least a portion of the wiring harness.

In any of the embodiments disclosed herein, the lamp holder can be configured to house at least a portion of the light source when the lamp holder is in the closed position.

In any of the embodiments disclosed herein, the water-resistant decorative lighting system can further comprise an electrically insulating member. The light source can comprise one or more electrical contacts. The electrically insulating member can be configured to insert between the one or more electrical contacts.

In any of the embodiments disclosed herein, at least a portion of the waterproofing device can be configured to seal around at least a portion of the electrically insulating member.

In any of the embodiments disclosed herein, the electrically insulating member can be a low melting point plastic. The low melting point plastic can be selected from the group consisting of ethylene propylene rubber (EPR), cycloaliphatic epoxy, ethylene-vinyl acetate (EVA), silicones, and combinations thereof.

In any of the embodiments disclosed herein, the outer bulb can further comprise a hollow internal cavity. The light source can be configured to vertically extend above the lamp holder when the lamp holder is in the closed position. The outer bulb can be configured to position at least a portion of the light source within the hollow internal cavity of the outer bulb.

In any of the embodiments disclosed herein, the light source can be selected from the group consisting of incandescent lamp, halogen lamp, neon lamp, fluorescent lamp, LED, mini-LED, micro-LED and combinations thereof.

In any of the embodiments disclosed herein, the light source can comprise a printed circuit board assembly.

In any of the embodiments disclosed herein, the waterproofing device can be selected from the group consisting of rubber, plastic, modified PVC, silicon tape, liquid electrical tape, heat shrink tube, nail polish, potting compound, and combinations thereof.

Some embodiments of the present disclosure provide a water-resistant decorative lighting system comprising a lamp assembly and a wiring harness. The lamp assembly can include a lamp holder, a light source, a waterproofing device, and an outer bulb. The lamp holder can comprise a first side portion, a second side portion, and a hinged portion. The first side portion can have a first locking mechanism. The second side portion can have a second locking mechanism. The hinged portion can be connected between the first and second side portions such that the lamp holder can be configured to move about the hinged portion from an open position to a closed position. The light source can be configured to fit within the lamp holder when the lamp holder is in the closed position. The outer bulb can be detachably attachable to the lamp holder. The wiring harness can have two or more insulated conductors.

Some embodiments of the present disclosure provide a method of assembling a water-resistant decorative lighting system. The method can comprise providing one or more lamp assemblies. The lamp assemblies can include a light source, a waterproofing device, and a wiring harness. The wiring harness can have two or more insulated conductors. The wiring harness can be configured to electrically connect the one or more lamp assemblies. The method can also comprise wrapping at least a portion of the waterproofing device at least partially around the light source. The method further can comprise wrapping at least a portion of the waterproofing device at least partially around the wiring harness. The method can comprise sealing the waterproofing device.

In any of the embodiments disclosed herein, the method can further comprise providing an electrically insulating member. The light source can comprise one or more electrical contacts. The electrically insulating member can be configured to insert between the one or more electrical contacts. The method can also comprise wrapping at least a portion of the waterproofing device at least partially around the electrically insulating member.

In any of the embodiments disclosed herein, the electrically insulating member can be a low melting point plastic selected from the group consisting of ethylene propylene rubber (EPR), cycloaliphatic epoxy, ethylene-vinyl acetate (EVA), silicones, and combinations thereof.

In any of the embodiments disclosed herein, the method can further comprise providing a lamp holder. The lamp holder can comprise a first and second side portions, and a hinged portion. the first side portion can have a first locking mechanism. The second side portion can have a second locking mechanism. The hinged portion can be connected between the first and second side portions such that the lamp holder can be configured to move about the hinged portion from an open position to a closed position. The light source can be configured to fit within the lamp holder when the lamp holder is in the closed position.

In any of the embodiments disclosed herein, the method can further comprise providing an outer bulb. The outer bulb can comprise a hollow internal cavity. The method can comprise positioning at least a portion of the light source configured to vertically extend above the lamp holder when the lamp holder is in the closed position within the hollow internal cavity of the outer bulb. The method can comprise securing the outer bulb to the lamp holder.

In any of the embodiments disclosed herein, the step of sealing the waterproofing device can be a step of irradiating with an ultraviolet light or a step of melting with a heat treatment.

In any of the embodiments disclosed herein, the waterproofing device can be selected from the group consisting of rubber, plastic, modified PVC, silicon tape, liquid electrical tape, heat shrink tube, nail polish, potting compound, and combinations thereof.

BRIEF DESCRIPTION OF THE FIGURES

Reference will now be made to the accompanying figures, which are not necessarily drawn to scale, and wherein.

DETAILED DESCRIPTION

Figure 1:
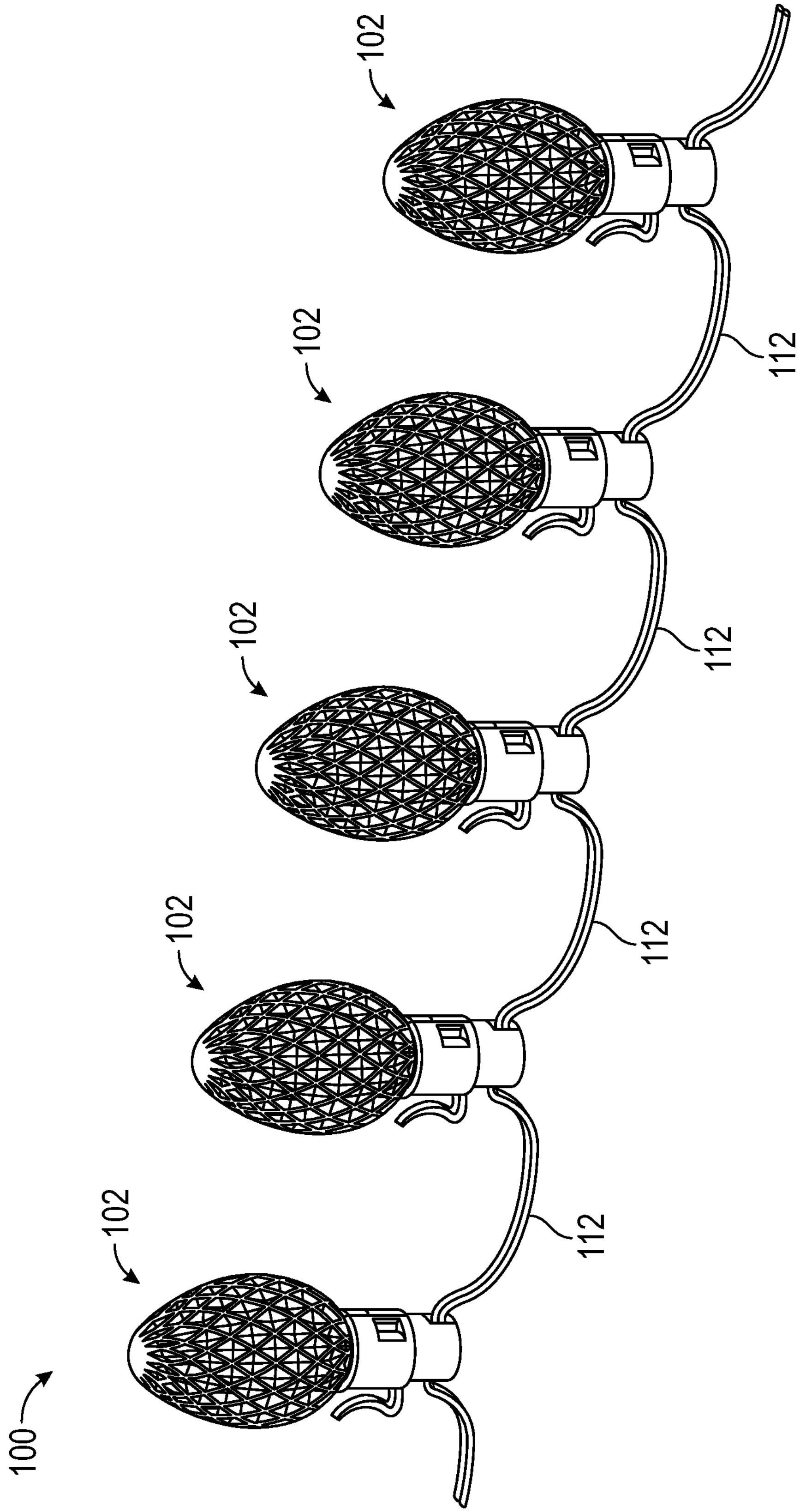
FIG. 1 depicts a perspective view of a decorative light string, in accordance with an example embodiment of the presently disclosed subject matter.

Embodiments of the disclosed technology include a water-resistant decorative lighting system for preventing fluids from entering the internal compartment of the plurality of lamp assemblies. In various embodiments, a water-resistant lamp assembly can provide a seal to prevent water from entering the lamp assembly. In some embodiments, a water-resistant lamp assembly can include a hinged lamp holder. In some embodiments, a decorative lighting system can be assembled according to the novel and improved method described further herein.

The present disclosure can be understood more readily by reference to the following detailed description of exemplary embodiments and the examples included herein. Before the exemplary embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology can, however, be embodied in many different forms and should not be construed as limited to the embodiments set forth therein. In the following description, numerous specific details are set forth. However, it is to be understood that embodiments of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described can include a particular feature, structure, or characteristic, but not every embodiment necessarily includes the particular feature, structure, or characteristic. Further, repeated use of the phrase "in one embodiment" does not necessarily refer to the same embodiment, although it can.

Also, in describing the exemplary embodiments, terminology will be resorted to for the sake of clarity. Unless otherwise noted, the terms used herein are to be understood according to conventional usage by those of ordinary skill in the relevant art. Further, it is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in an illustrative embodiment. Such illustrative embodiments are not, however, intended to be limiting. The materials described hereinafter as making up the various elements of the embodiments of the present disclosure are intended to be illustrative and not restrictive. Many suitable materials that would perform the same or a similar function as the materials described herein are intended to be embraced within the scope of the exemplary embodiments. Such other materials not described herein can include, but are not limited to, materials that are developed after the time of the development of the present disclosure, for example.

Throughout this disclosure, certain embodiments are described in exemplary fashion in relation to a lamp assembly on a decorative lighting system. However, embodiments of the disclosed technology are not so limited. In some embodiments, the disclosed technique can be effective in other types of electric lamp assemblies, such as outdoor lamp fixtures.

Referring now to the drawings, FIG. 1 illustrates an example embodiment of a fully assembled water-resistant decorative lighting system 100. In some embodiments, the water-resistant decorative lighting system 100 can include a plurality of water-resistant lamp assemblies 102. In some embodiments, each water-resistant lamp assembly 102 can be in electrical communication with one or more water-resistant lamp assemblies 102. In some embodiments, the electrical communication can be in series, parallel, series-parallel connection, and combinations thereof. In some embodiments, the water-resistant lamp assemblies 102 can include a shunting device to keep a lighting system 100 in electrical communication and illuminated, even if one of its bulbs burns out. In some embodiments, the electrical communication can be facilitated via one or more electrical wires. In some embodiments, the electrical communication can be facilitated via a wiring harness 112 having one or more wires or insulated conductors 112*a*, 112*b*.

Figure 2A:
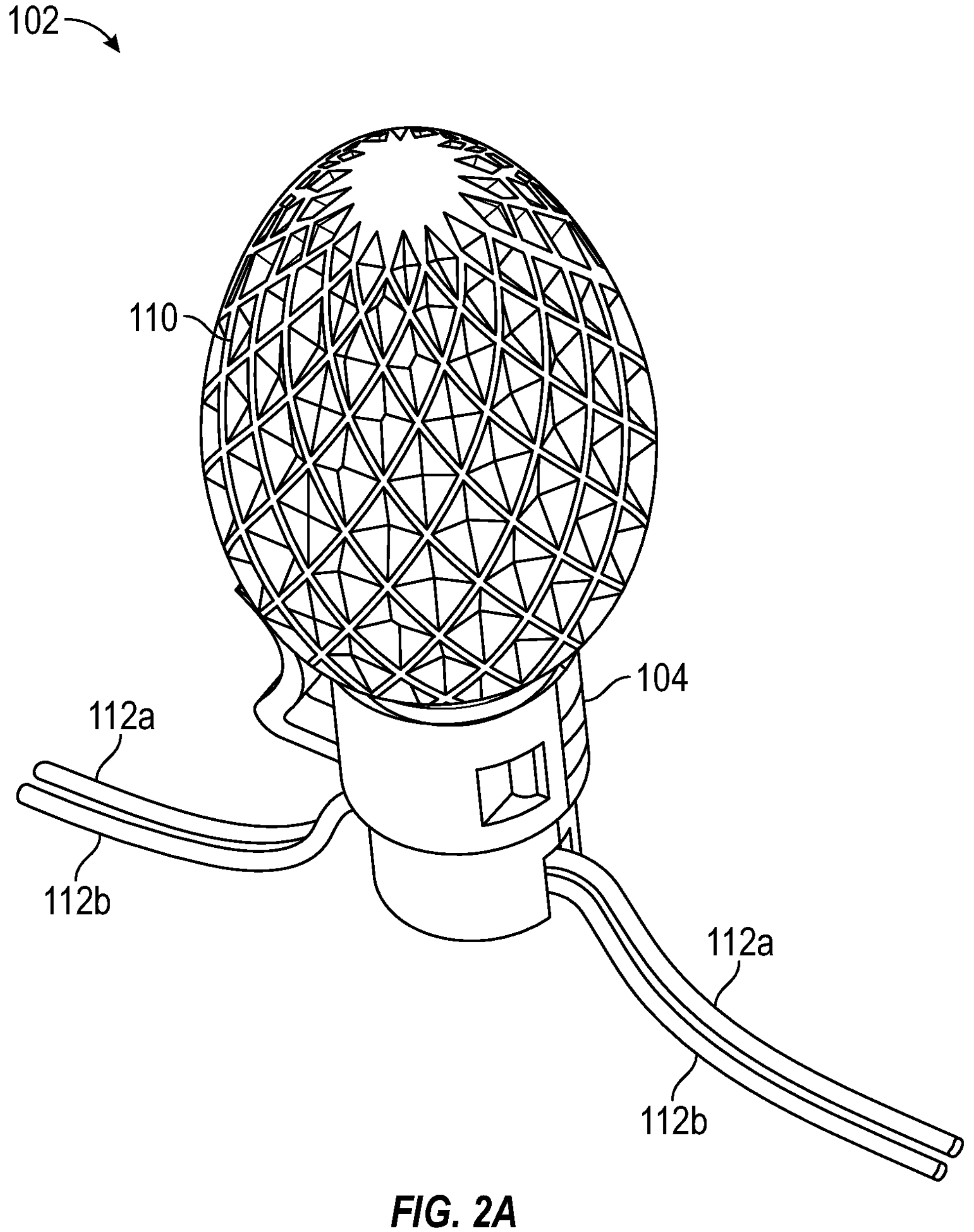
FIG. 2A depicts a perspective view of a lamp assembly, in accordance with an example embodiment of the presently disclosed subject matter.

FIG. 2A depicts a perspective view of a lamp assembly, in accordance with an example embodiment of the presently disclosed subject matter. As shown in FIG. 2A, the water-resistant light assembly 102 can include a lamp holder 104, a light source 106, a waterproofing device 108, and an outer bulb 110, and a wiring harness 112 having two or more insulated conductors 112*a*, 112*b*. In some embodiments, one or more first insulated conductors 112*a*, 112*b* can lead into the lamp holder 104. For example, as shown in FIG. 2A, the one or more insulated conductors 112*a*, 112*b* can lead into an aperture of the lamp holder 104. In some embodiments, the insulated conductors 112*a*, 112*b* can be insulated wires. The insulated conductors 112*a*, 112*b* can provide electrical power to the lamp assembly 102 and can be connected to, or can be a part of, for example, a light string (e.g., decorative light string 100), an electrical outlet, or another power source. In some embodiments, the insulated conductors 112*a*, 112*b* can also include one or more signal wires that can provide signals to the lamp assembly that can control the lamp assembly.

In some embodiments, the lamp holder 104 can comprise a first side portion 302, a second side portion 304, and a hinged portion 306. In some embodiments, the first side portion 302 and second side portion 304 can be joined by the hinged portion 306 such that they can be folded together about the hinged portion 306. In some embodiments, the first side portion 302 can have a first locking mechanism. In some embodiments, the second side portion 304 can have a second locking mechanism. In some embodiments, when the first side portion 302 and the second side portion 304 are folded together about the hinged portion 306, the first and second locking mechanism cause the first side portion 302 to be locked closed with the second side portion 304. In some embodiments, the first locking mechanism can comprise one or more latches 308. In some embodiments, the second locking mechanism can comprise one or more receiving slots 310. The one or more latches 308 can be configured to couple with the one or more receiving slots 310. In some embodiments, the coupling can be reversible.

In some embodiments, the lamp holder 104 can be made of many different materials, including, but not limited to, plastic, polymer, metal, glass, and combinations thereof. In some embodiments, the lamp holder 104 can be flexible. In some embodiments, the lamp holder 104 can be molded plastic piece, such as, for example, a mold of polypropylene or another similar material.

Figure 2B:
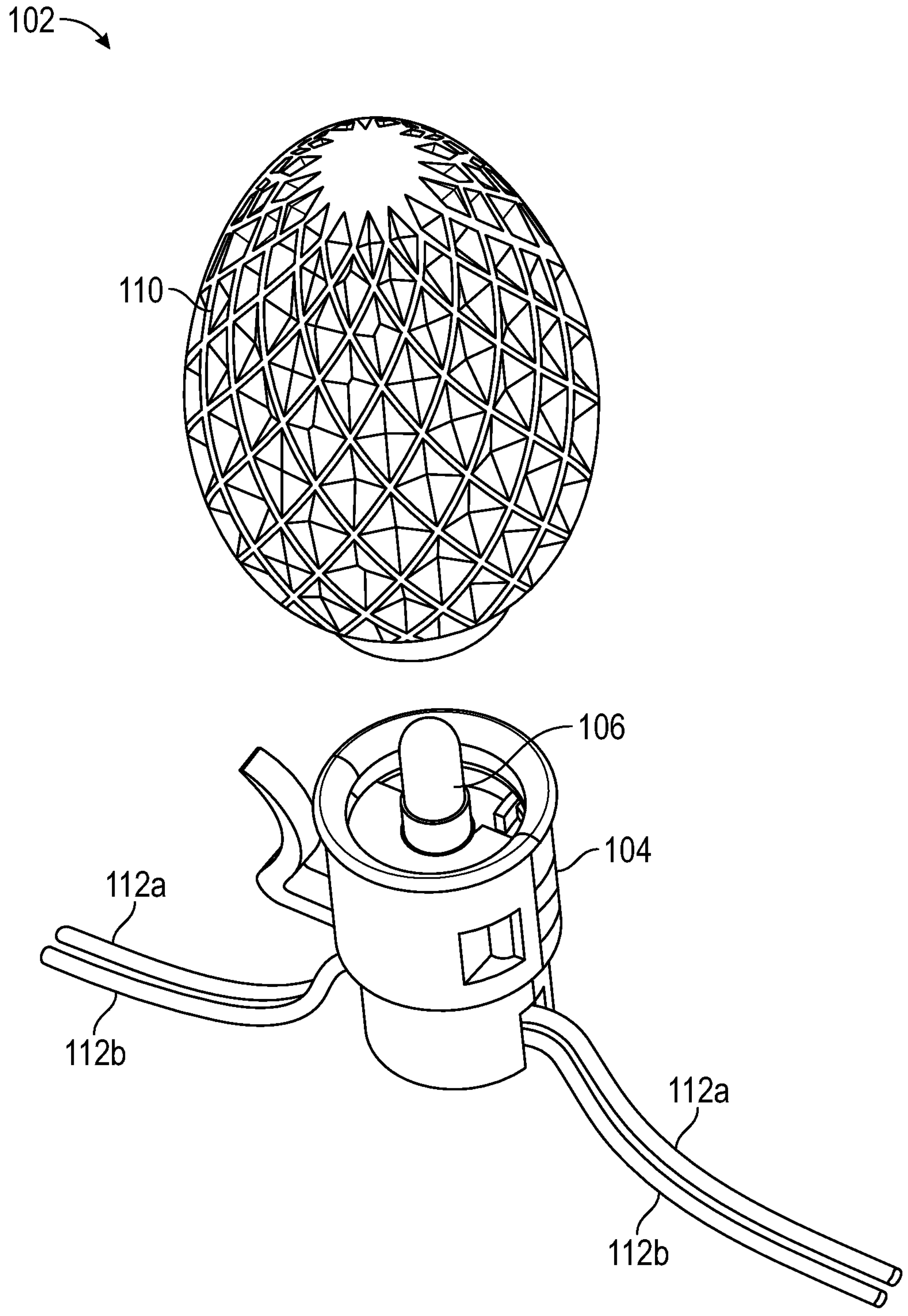
FIG. 2B depicts an exploded perspective view of a lamp assembly, in accordance with an example embodiment of the presently disclosed subject matter.

FIG. 2B depicts an exploded perspective view of a lamp assembly, in accordance with an example embodiment of the presently disclosed subject matter. As shown in FIG. 2B, the lamp holder 104 can partially house and protect a light source 106. In some embodiments, the light source 106 can provide illumination or decorative lighting. For example, lamp holder 104 can serve to house a light source 106 or lamp, such as, for example, an LED or incandescent lamp. The light source 106 can be a lighting element that provides a source of light or illumination. According to some embodiments, the light source 106 can be an LED, an incandescent lamp, halogen lamp, neon lamp, fluorescent lamp, micro-LED, or any other suitable lighting element. According to some embodiments, the light source 106 can be partially housed within the lamp holder 104. For example, in some embodiments, the lamp holder 104 can define a hollow cavity within which the light source 106 can be seated. In some embodiments, the light source 106 can be fully housed within the lamp holder 104. In some embodiments, the light-emitting portion of the light source 106 can be positioned such that it extends vertically above the lamp holder 104 and into an internal cavity of an outer bulb 106. According to some embodiments, the light source 106 can include a printed circuit board assembly (PCBA). One or more different LEDs, mini-LED arrays or micro-LED arrays can be assembled on the PCBA, such that the light source 106 can create different lighting effects, such as dripping water, or a shooting star effect.

In some embodiments, as shown in FIG. 2B, the outer bulb 110 can be detachably attached to the lamp holder 104. Accordingly, in some embodiments, a lower portion of the outer bulb 110 can attach to the lamp holder 104 such that the lamp holder 104 can securely hold the outer bulb 110. For example, the outer bulb 110 can screw into the lamp holder 104, snap into the lamp holder 104, be secured by tabs that slide into receiving slots of the lamp holder 104 or can be secured to the lamp holder 104 by any other similar method. The lamp holder 104 can be arranged in many shapes and sizes, but as one skilled in the art will recognize, the lamp holder 104 should be of a shape to conveniently receive the outer bulb 110.

Figure 2C:
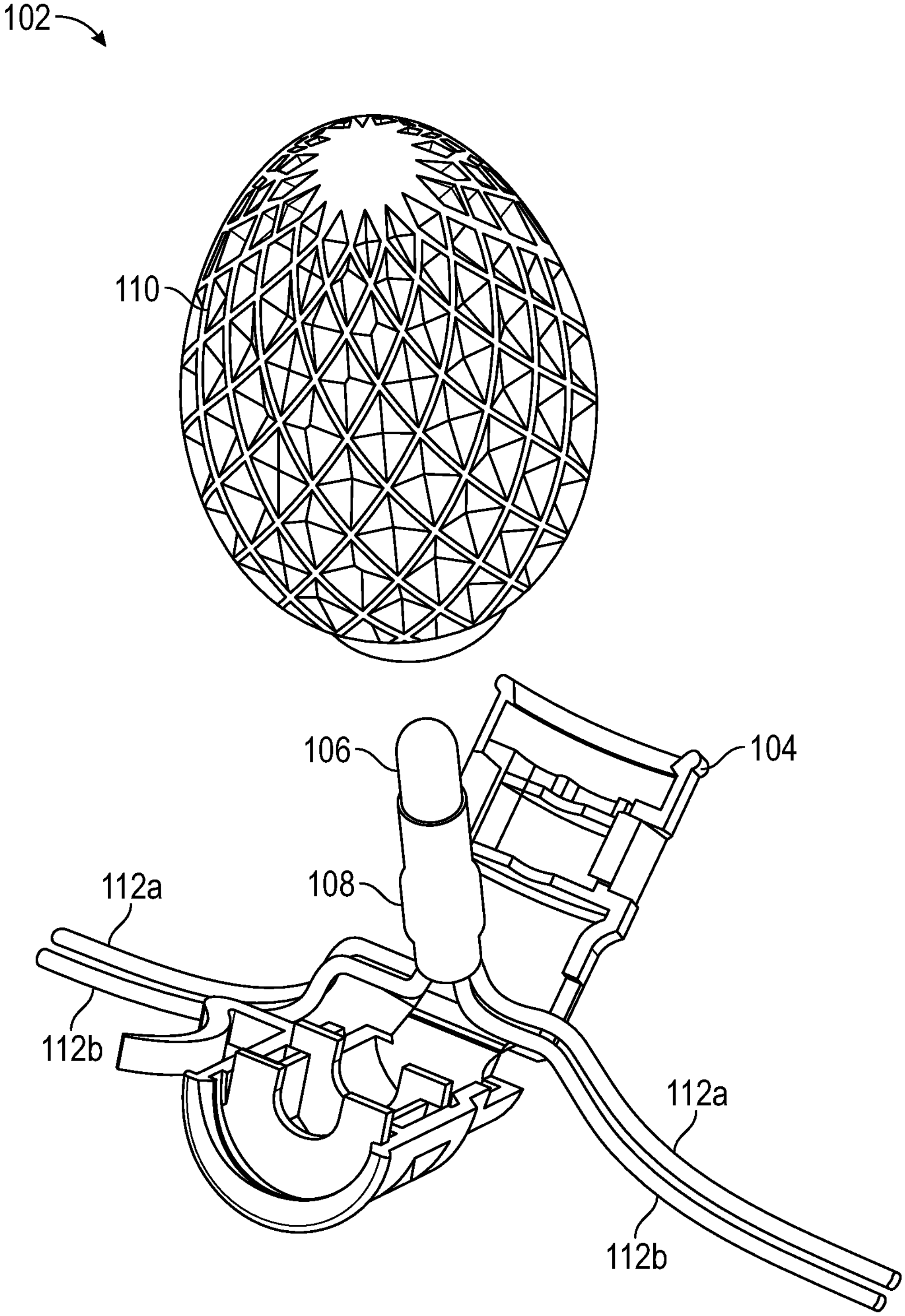
FIG. 2C is an exploded perspective view of a lamp assembly, in accordance with an example embodiment of the presently disclosed subject matter.
Figure 2D:
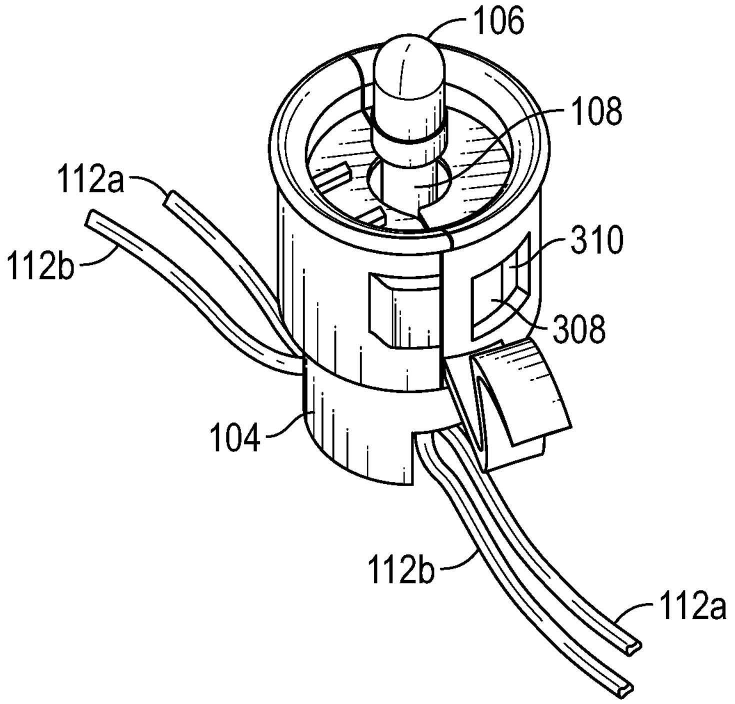
FIGS. 2D and 2E are perspective views of a lamp assembly, in accordance with an example embodiment of the presently disclosed subject matter.
Figure 2E:
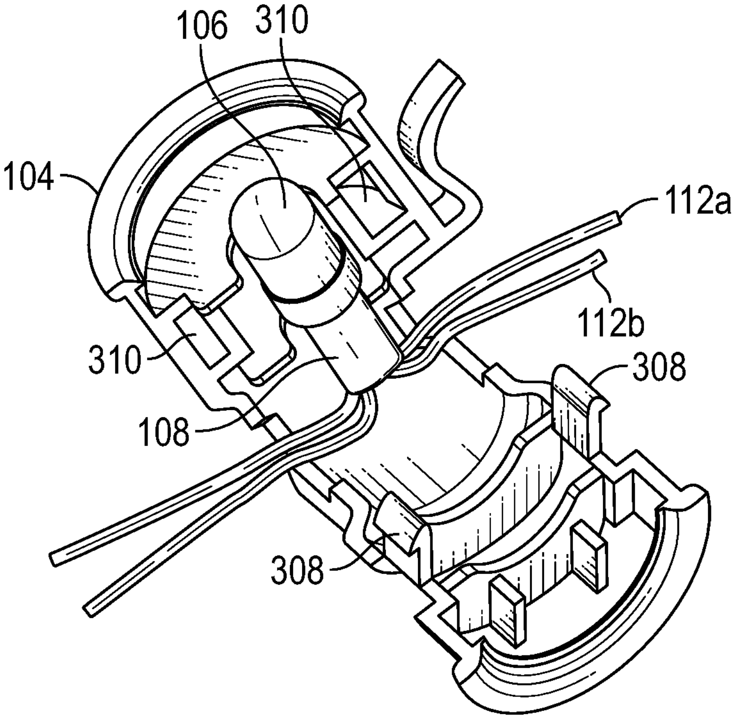

FIG. 2C is an exploded perspective view of a lamp assembly, in accordance with an example embodiment of the presently disclosed subject matter. As shown in FIG. 2C, in some embodiments, a lamp holder 104 can house a portion of a light source 106, a waterproofing device 108, and a wiring harness 112 having two or more insulated conductors 112*a*, 112*b*. In some embodiments, the wiring harness 112 can be electrically connected to, or an extension of, one or more electrical contacts 106*a*, discussed further herein with reference to FIG. 4, of lamp or light source 106. As shown, when the lamp holder 104 can be positioned around the light source 106 and/or the waterproofing device 108 and/or the wiring harness 112 having two or more insulated conductors 112*a*, 112*b*. In some embodiments, a hollow space between the outer surfaces of the light source 106 and/or wiring harness 112 and the internal walls of the lamp holder 104 can exist. Such hollow spaces can provide a space for water to accumulate if water were to leak into the internal cavity of the lamp holder 104. As will be appreciated, if water were to accumulate within a hollow space provided by the lamp holder 104, such water can come into contact with one or more of the insulated conductors 112*a*, 112*b*, the electrical contacts 106*a*, and/or the light source 106 and can interfere with the proper functioning of the decorative lighting system 100. In order to prevent such an occurrence, a waterproofing device 108 can be placed around the electrical junction of the light source 106, the electrical contacts 106*a*, and/or the insulated conductors 112*a*, 112*b*. FIGS. 2D and 2E are prospective views of a disassembled lamp assembly 102 including a lamp holder 104 closed around a light source 106, according to an example embodiment of the present disclosure.

FIGS. 3A-3D depict various views of a lamp holder, in accordance with an example embodiment of the presently disclosed subject matter. As shown in FIGS. 3A-3D, lamp holder 104 can be a hinged lamp holder. In some embodiments, lamp holder 104 can be designed to receive and secure an outer bulb 110. For example, in some embodiments, an internal surface of the lamp holder 104 can include ridges or grooves such that an outer bulb 110 can be screwed into the lamp holder 104, providing a seal to prevent leaking. In some embodiments, the lamp holder 104 can include tabs or ridges such that an outer bulb 110 can be snapped into the lamp holder 104. As discussed further herein, such a hinged lamp holder 104 can allow for more stream-lined assembly of a decorative lighting system 100.

Figure 3A:
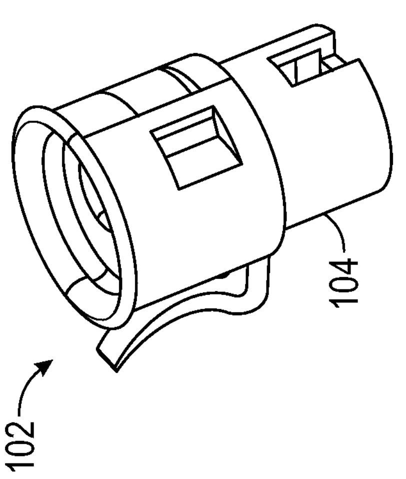
FIGS. 3A-3D depict various views of a lamp holder, in accordance with an example embodiment of the presently disclosed subject matter.
Figure 3B:
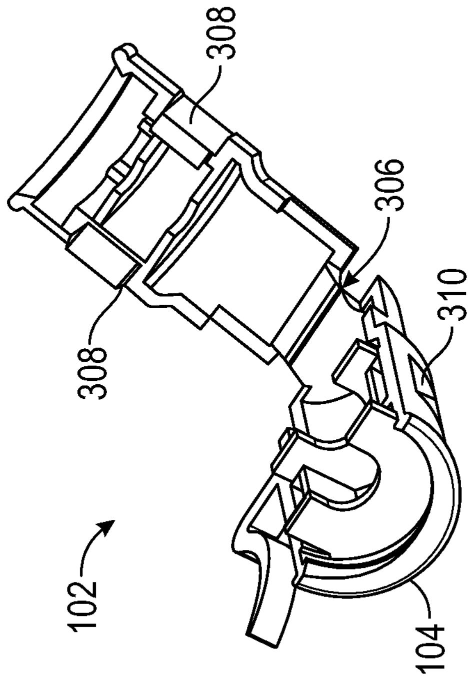
Figure 3C:
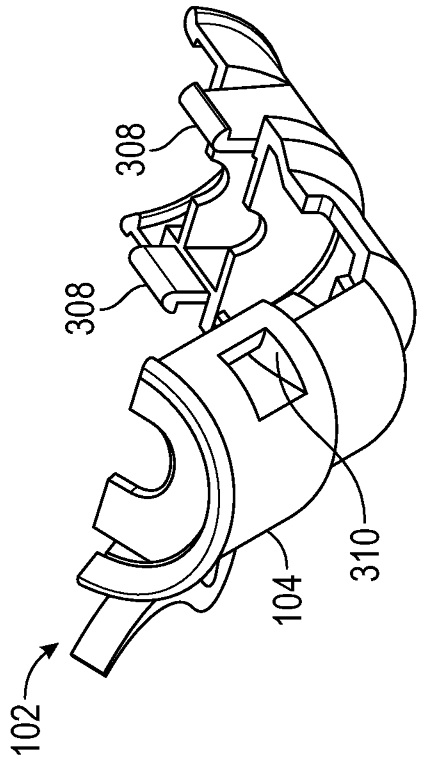
Figure 3D:
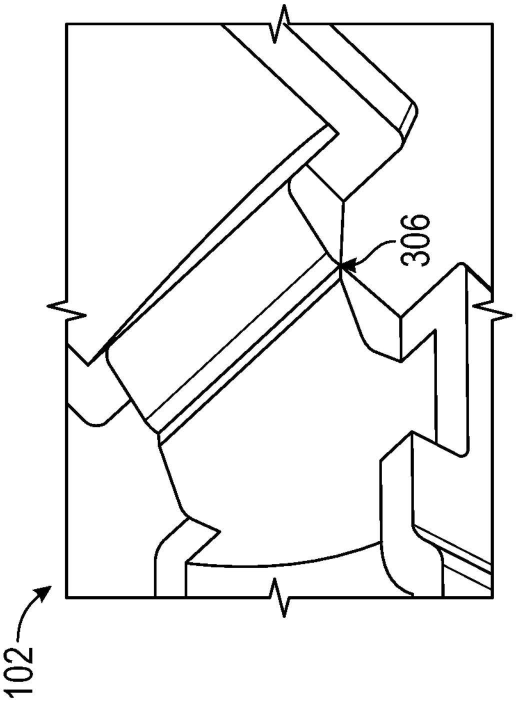
Figure 3E:
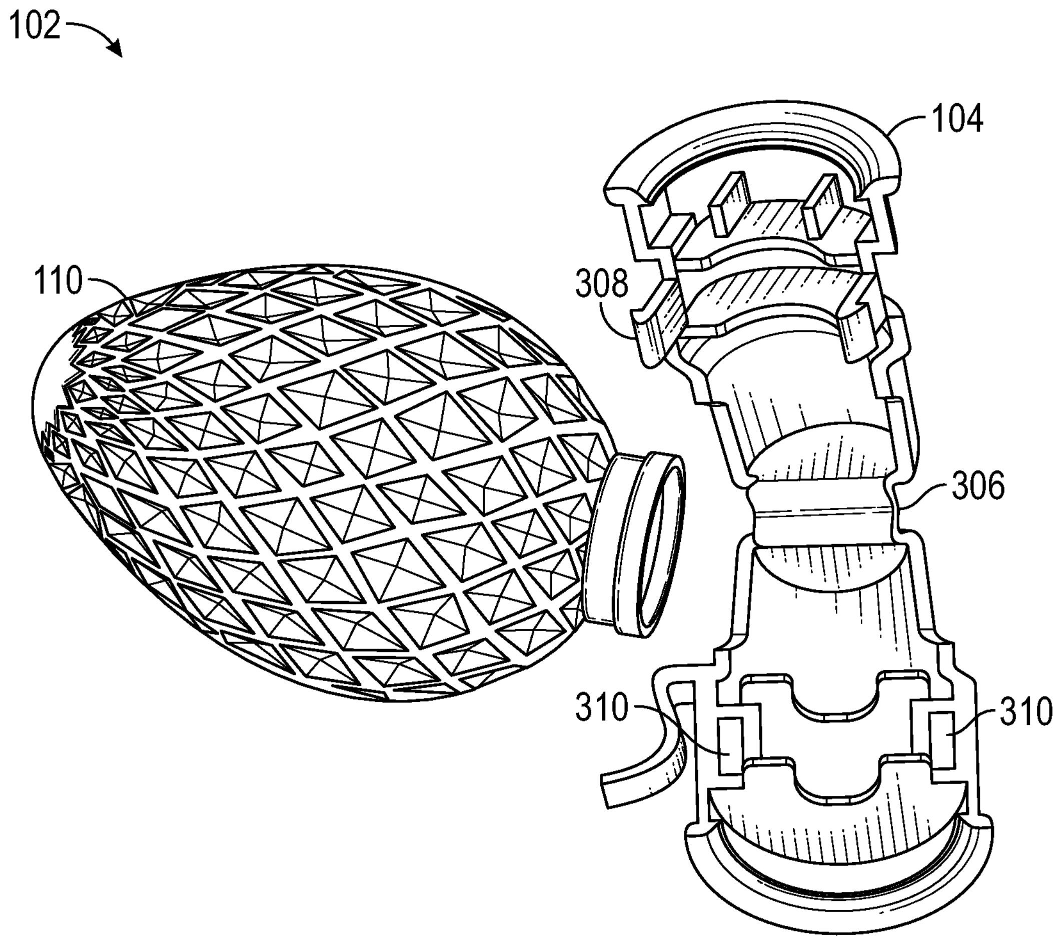
FIG. 3E is a perspective view of a lamp assembly, in accordance with an example embodiment of the presently disclosed subject matter.

FIG. 3E is a perspective view of a lamp assembly, in accordance with an example embodiment of the presently disclosed subject matter. As shown in FIG. 3E, the outer bulb 110 can be detachably attachable to the lamp holder 104. FIG. 3E shows a perspective view of a disassembled lamp assembly 102 including a lamp holder 104 in an open position and outer bulb 110, according to an example embodiment of the present disclosure. In some embodiments, the outer bulb 110 can be made of many different translucent or transparent materials, including, but not limited to, glass, plastic, and the like. In some embodiments, the outer bulb can be many different sizes and/or shapes, including but not limited to arbitrary, bulged, blown tubular, bulged reflector, candle, candle angular, candle twisted, crystalline pear, extended candle, ellipsoidal, ellipsoidal dimple, ellipsoidal reflector, flambeau, globe, decorator, krypton, pear, hexagonal candle, pear-straight, sealed beam, blown reflector, double reflector, straight-sided, straight-tubular, tubular, tubular angular, and the like. In some embodiments, the outer bulb can be any color.

Figure 4:
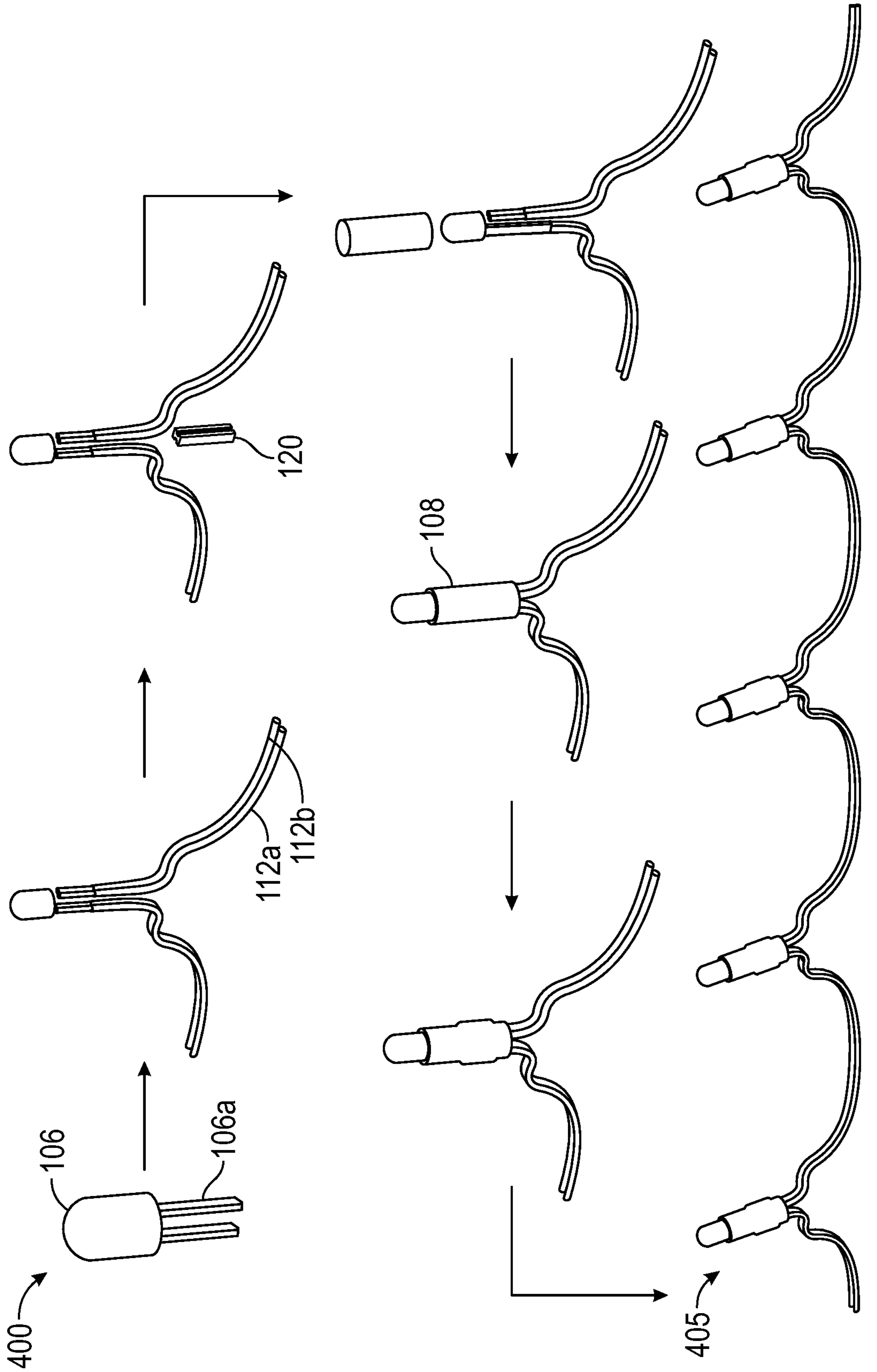
FIG. 4 depicts a method of assembling a decorative light string, in accordance with an example embodiment of the presently disclosed subject matter.

In some embodiments, the water-resistant light assembly 102 can include a lamp holder 104, a light source 106, a waterproofing device 108, an electrically insulating member 120, and a wiring harness 112 having two or more insulated conductors 112*a*, 112*b*. As shown in FIG. 4, the light source 106 can comprise one or more electrical contacts 106*a*.

FIG. 4 shows a method 400 of assembling a decorative lighting system 405, in accordance with an example embodiment of the presently disclosed subject matter. In some embodiments and as shown, the light source 106 can include an LED lamp having one or more electrical contacts 106*a* or pins. The electrical contacts 106*a* can extend out of the bottom of the light source 106. As depicted, a wiring harness 112 having one or more insulated conductors (e.g., insulated conductors 112*a*, 112*b*) can be connected to the one or more pins of the LED lamp. For example, the insulated conductors 112*a*, 112*b* can be soldered to the one or more electrical contacts or pins 106*a*. As further described herein with reference to FIG. 4, an electrically insulating member 120 can be inserted between the electrical contacts or pins 106*a* of the light source 106. In some embodiments, the electrically insulating member 120 can be a molded strip comprising a low melting point plastic, selected from the group consisting of ethylene propylene rubber (EPR), cycloaliphatic epoxy, ethylene-vinyl acetate (EVA), silicones, and combinations thereof. As will be appreciated, many other suitable materials can be utilized which would cause electrical isolation between a plurality of electrical contacts 106*a* of a light source 106.

As further depicted, a waterproofing device 108, such as a heat shrink sleeve, can be placed over a portion of the light source 106. In some embodiments, the waterproofing device 108 can be placed over the electrical contacts 106*a* of the light source 106 and a portion of the insulated conductors 112*a*, 112*b* in order to seal off any exposed portions of wire. As will be appreciated such a design will prevent water from coming into contact with insulated conductors 112*a*, 112*b* or electrical contacts 106*a* of the light source 106. The waterproofing device 108 can be a device or sealant made of rubber, plastic, modified PVC, silicon tape, liquid electrical tape, nail polish, potting compound, or some other suitable material. In some embodiments, the waterproofing device 108 can contract when heat is applied. Heat can then be applied in order to secure the waterproofing device 108 in place. In some embodiments, heat can be applied to the waterproofing device 108 by means of a hot air gun or heat gun. In some example embodiments, when the heat is applied, a waterproofing device 108 can shrink and can partially melt around a portion of the electrically insulating member 120, the insulated conductors 112*a*, 112*b*, and/or the electrical contacts 106*a* of the light source 106 such that the waterproofing device 108 can become sealed around the electrical components and/or live parts. In some embodiments, upon cooling of the lamp assembly 102, the partially melted electrically insulating member 120 can act as a seal around the electrical components and/or live parts causing the lamp assembly 102, and/or the lighting system 100 to become more resilient against water intrusion.

In some embodiments, ultraviolet (UV) light can be applied to the waterproofing device 108. In some example embodiments, when the UV light is applied, the waterproofing device 108 can cure around a portion of the electrically insulating member 120, the insulating conductors 112*a*, 112*b*, and/or the electrical contacts 106*a* of the light source 106, such that the waterproofing device 108 can become sealed around the electrical components and/or live parts. In some embodiments, upon cooling of the lamp assembly 102, the cured waterproofing device 108 can act as a seal around the electrical components and/or live parts causing the light assembly 102 and/or the lighting system 100 to become more resilient against water intrusion. Such a method can be repeated a plurality of times in order to create a water-resistant decorative lighting system 100 including a plurality of water-resistant lighting assemblies 102.

In some embodiments, such lighting system 100 can be assembled into one or more strings. In some example embodiments, such lighting system 100 can be assembled on to all kinds of Christmas decorative products, such as trees, wreaths, garlands, or decorative designs. Some potential decorative lighting system designs can include, but are not limited to, gifts, candy cane(s), Santa Claus, snowman, snow flake, reindeer, Christmas tree(s), North Pole, elf, manger, cross, ornament, sled, holly, bells, stockings, star, candle(s), sack of gifts, wreath, mistletoe, and the like. One skilled in the art would appreciate that the water-resistant decorative lighting system 100 can include many decorations for many holidays (e.g., Halloween, Thanksgiving, Independence Day, birthdays, etc.).

As will be appreciated, the decorative lighting system 405 will maintain a smaller geometric footprint than a design incorporating previously discussed lamp holder 104 and outer bulb 110. Such a design can be advantageous for certain embodiment, such as for example, use in certain artificial trees. The smaller profile can allow for more focus on the other aesthetics of the tree. As will be further appreciated, the method can further include adding lamp holders 104 and outer bulbs 110 to the lighting units 106. As will be further appreciated, such a method 400 allows for a more streamlined method of manufacturing light strings as the decorative lighting system 405 can be used as manufactured independent of lamp holders. Further, such a method allows for more customization of a standard light string 405. For example, the light string 405 can be deployed and used as manufactured or it can be further customized to include additional decorative and functional features (e.g., lamp holder and outer bulb).

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A water-resistant decorative lighting system comprising:
- a plurality of lamp assemblies, each lamp assembly of the plurality of lamp assemblies including:
  - a lamp holder, the lamp holder comprising:
    - a first side portion having a first locking mechanism;
    - a second side portion having a second locking mechanism; and
    - a hinged portion connected between the first and second side portions such that the lamp holder is configured to move about the hinged portion from an open position to a closed position;
  - a light source configured to fit within the lamp holder when the lamp holder is in the closed position;
  - a waterproofing device;
  - an outer bulb detachably attachable to the lamp holder; and
  - an electrically insulating member configured to be inserted between one or more electrical contacts of the light source; and
- a wiring harness having two or more insulated conductors, the wiring harness configured to electrically connect the plurality of lamp assemblies,
- wherein at least a portion of the waterproofing device is configured to seal around at least a portion of the light source, at least a portion of the wiring harness, and at least a portion of the electrically insulating member.

2. The water-resistant decorative lighting system of claim 1, wherein the outer bulb further comprises a hollow internal cavity;
- wherein the light source is configured to vertically extend above the lamp holder when the lamp holder is in the closed position; and
- wherein the outer bulb is configured to position at least a portion of the light source within the hollow internal cavity of the outer bulb.

3. The water-resistant decorative lighting system of claim 2, wherein the electrically insulating member is a low melting point plastic selected from the group consisting of ethylene propylene rubber (EPR), cycloaliphatic epoxy, ethylene-vinyl acetate (EVA), silicones, and combinations thereof.

4. The water-resistant decorative lighting system of Claim 2, wherein the waterproofing device is selected from the group consisting of rubber, plastic, modified PVC, silicon tape, liquid electrical tape, heat shrink tube, nail polish, potting compound, and combinations thereof.

5. The water-resistant decorative lighting system of claim 2, wherein the lamp holder is configured to house at least a portion of the light source when the lamp holder is in the closed position.

6. The water-resistant decorative lighting system of claim 2, wherein the outer bulb further comprises a hollow internal cavity;
- wherein the light source is configured to vertically extend above the lamp holder when the lamp holder is in the closed position; and
- wherein the outer bulb is configured to position at least a portion of the light source within the hollow internal cavity of the outer bulb.

7. The water-resistant decorative lighting system of claim 2, wherein the light source is selected from the group consisting of incandescent lamp, halogen lamp, neon lamp, fluorescent lamp, LED, mini-LED, micro-LED and combinations thereof.

8. The water-resistant decorative lighting system of claim 2, wherein the light source further comprises a printed circuit board assembly.

9. The water-resistant decorative lighting system of claim 1, wherein the first locking mechanism comprises one or more latches, wherein the second locking mechanism comprises one or more receiving slots, and wherein the one or more latches are configured to couple with the one or more receiving slots.

10. The water-resistant decorative lighting system of claim 1, wherein the lamp holder is configured to house at least a portion of the light source when the lamp holder is in the closed position.

11. The electrically insulating member of claim 1, wherein the electrically insulating member is a low melting point plastic selected from the group consisting of ethylene propylene rubber (EPR), cycloaliphatic epoxy, ethylene-vinyl acetate (EVA), silicones, and combinations thereof.

12. The water-resistant decorative lighting system of claim 1, wherein the light source is selected from the group consisting of incandescent lamp, halogen lamp, neon lamp, fluorescent lamp, LED, mini-LED, micro-LED, and combinations thereof.

13. The water-resistant decorative lighting system of claim 1, wherein the light source comprises a printed circuit board assembly.

14. The water-resistant decorative lighting system of claim 1, wherein the waterproofing device is selected from the group consisting of rubber, plastic, modified PVC, silicon tape, liquid electrical tape, heat shrink tube, nail polish, potting compound, and combinations thereof.

15. A method of assembling a water-resistant decorative lighting system, the method comprising:

providing one or more lamp assemblies including:

a light source;

a waterproofing device; and a wiring harness having two or more insulated conductors, the wiring harness configured to electrically connect the one or more lamp assemblies;

providing an electrically insulating member configured to be inserted between one or more electrical contacts of the light source;

wrapping at least a portion of the waterproofing device at least partially around the light source;

wrapping at least a portion of the waterproofing device at least partially around the electrically insulating member;

wrapping at least a portion of the waterproofing device at least partially around the wiring harness;

sealing the waterproofing device;

providing a lamp holder, the lamp holder comprising:

a first side portion having a first locking mechanism;

a second side portion having a second locking mechanism;

a hinged portion connected between the first and second side portions such that the lamp holder is configured to move about the hinged portion from an open position to a closed position; and wherein the light source is configured to fit within the lamp holder when the lamp holder is in the closed position.

16. The method of claim 15, wherein the electrically insulating member is a low melting point plastic selected from the group consisting of ethylene propylene rubber (EPR), cycloaliphatic epoxy, ethylene-vinyl acetate (EVA), silicones, and combinations thereof.

17. The method of claim 15, further comprising:

providing an outer bulb comprising a hollow internal cavity;

positioning at least a portion of the light source configured to vertically extend above the lamp holder when the lamp holder is in the closed position within the hollow internal cavity of the outer bulb; and securing the outer bulb to the lamp holder.

18. The method of claim 15, wherein the step of sealing the waterproofing device is a step of irradiating with an ultraviolet light or a step of melting with a heat treatment.

19. The method of claim 15, wherein the waterproofing device is selected from the group consisting of rubber, plastic, modified PVC, silicon tape, liquid electrical tape, heat shrink tube, nail polish, potting compound, and combinations thereof.

20. A water-resistant decorative lighting system comprising:

a lamp assembly including:

a lamp holder, the lamp holder comprising:

a first side portion having a first locking mechanism;

a second side portion having a second locking mechanism; and a hinged portion connected between the first and second side portions such that the lamp holder is configured to move about the hinged portion from an open position to a closed position;

a light source configured to fit within the lamp holder when the lamp holder is in the closed position;

a waterproofing device;

an outer bulb detachably attachable to the lamp holder; and an electrically insulating member configured to be inserted between one or more electrical contacts of the light source; and a wiring harness having two or more insulated conductors, wherein at least a portion of the waterproofing device is configured to seal around at least a portion of the light source, at least a portion of the wiring harness, and at least a portion of the electrically insulating member.

21. The water-resistant decorative lighting system of claim 20, wherein the first locking mechanism comprises one or more latches;

wherein the second locking mechanism comprises one or more receiving slots; and wherein the one or more latches are configured to couple with the one or more receiving slots.

* * * * *